United States Patent Office 2,905,737
Patented Sept. 22, 1959

2,905,737

SULFUR VULCANIZED RUBBER COMPOSITION CONTAINING PHENOL REACTION PRODUCT AS AN OXIDATION INHIBITOR, AND METHOD OF MAKING SAME

Frederick J. Webb, Cuyahoga Falls, Ohio, assignor to The Firestone Tire & Rubber Company, Akron, Ohio, a corporation of Ohio No Drawing. Application July 5, 1955
Serial No. 520,131

12 Claims. (Cl. 260—810)

This invention relates to inhibitors of the deterioration of vulcanized compositions of natural rubber. The rubber compositions may be those used in tires, inner tubes, foamed rubber products, rubber thread and other rubber articles.

The deterioration of rubber is evidenced in different ways and different tests have been devised to determine the effect of different conditions on rubber compositions. Thus, for example, in pneumatic tires, inner tubes and power-transmitting belts the preservation of the tensile strength of the rubber is important.

It is also important to preserve the white, or nearly white, color of rubber compositions designed for many uses. Thus, in white-sidewall tires and in foamed-latex mattresses, pillows and upholstery padding, the preservation of the light color of the rubber vulcanizate is desirable. The inhibitors to which this invention relates preserve the rubber with little or no change in its color.

The inhibitors of this invention are reaction products of 2,6-bishydroxymethyl 4-aryl-substituted phenols and alkyl phenols or hydrocarbon-substituted alkyl phenols. These inhibitors have the following general formula:

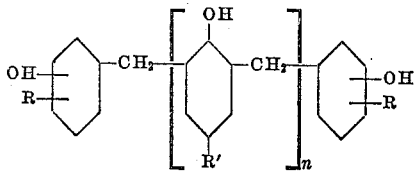

in which R' is an aryl hydrocarbon radical; R is one or more alkyl or hydrocarbon-substituted alkyl groups of 1 to 9 carbon atoms each; and n is 1 to 5. In the preferred compounds n is 1, and the products are crystalline. The R groups may be the same or different.

In preparing the inhibitors, a 2,6-bishydroxymethyl 4-aryl-substituted phenol is employed. A method of preparing a typical substituted phenol follows:

PREPARATION OF BISHYDROXYMETHYL-4-PHENYLPHENOL

To a solution of 85 grams (0.50 mole) of 4-phenylphenol and 25 grams of sodium hydroxide in 100 ml. of water and 250 ml. of ethanol there was added 100 grams of formalin (37 percent aqueous). The reaction mixture was allowed to stand eight days at room temperature in a covered beaker and then partially evaporated at low temperature in vacuo. The yellow sodium salt which separated was filtered off, dissolved in water, and acidified with glacial acetic acid to give 74.3 grams of a white crystalline solid. This melted to a cloudy liquid at 105–110° C. after crystallization from ethyl acetate-petroleum ether. For analysis, 5 grams of the product were recrystallized twice from ethyl acetate and petroleum ether, twice from acetic acid and water, and twice from ethanol and water to give a constant melting point of 111–112° C.

Analysis: Calcd. for $C_{14}H_{14}O_3$: C, 73.00; H, 6.13. Found: C, 73.09, 72.90; H, 6.00, 6.06.

The procedure of Ullman and Brittner, Ber. 42, 2540 (1909) may be used, replacing p-cresol by such compounds as phenylphenol, any 4-tolylphenol, any 4-xylylphenol, either 4-naphthylphenol, or any 4-methylnaphthylphenol, using appropriate solvents.

The phenols with which such 2,6-bishydroxymethyl-4-aryl phenols may be reacted in preparing the inhibitors of this invention include, for example:
4-methylphenol
2-methylphenol
Any 4-butylphenol
Any 2-octylphenol
2,4-dimethylphenol
3,4-dimethylphenol
3,5-dimethylphenol
2,5-dimethylphenol
Any 2-ethyl, propyl, butyl, amyl, hexyl, heptyl, octyl, or nonyl-5-methylphenol
Any 2-ethyl, propyl, butyl, amyl, hexyl, heptyl, octyl, or nonyl-4-methylphenol
2-methyl-4- or 5-ethylphenol
8-t-butyl or tt-octyl-4- or 5-i-propylphenol
Any diethyl, dipropyl, dibutyl, diamyl, dihexyl, diheptyl, dioctyl, or dinonyl phenol
2,3,4,5-tetramethylphenol
Any α-methylbenzyl methylphenol
Any α,α-dimethylbenzyl octylphenol
Any di-α-methylbenzylphenol
Any di-α,α-dimethylbenzylphenol
2-n-butyl-4-methylphenol
2-t-butyl-4-methylphenol
2-t-amyl-4-methylphenol
2-sec. amyl-4-methylphenol
2-t-hexyl-4-methylphenol
2-n-heptyl-4-methylphenol
2-t-octyl-4-methylphenol
2-tt-octyl-4-methylphenol
Petroleum cresylic acids
Alkylated cresylic acids The preparation of several inhibitors is given as illustrative:

*Example 1*

REACTION PRODUCT OF BISHYDROXYMETHYL-4-PHENYLPHENOL AND 6-T-BUTYL-3-METHYLPHENOL

A mixture of 9.8 grams (0.06 mole) of 6-t-butyl-3-methylphenol and 6.9 grams (0.03 mole) of 2,6-bishydroxymethyl-4-phenylphenol in glacial acetic acid was saturated with dry hydrogen chloride and allowed to stand 13 days at room temperature. The mixture was diluted with about 800 ml. of water and the supernatant liquid discarded. The somewhat gummy white precipitate solidified on washing with water. It was ground in a mortar and washed thoroughly with water on a Buchner funnel. The air-dried product was a white granular solid melting at 90–100° C. Weight 14.8 grams.

*Example 2*

REACTION PRODUCTS OF BISHYDROXYMETHYL-4-PHENYLPHENOL AND 2-TT-OCTYL-4-METHYLPHENOL

A mixture of 13.2 grams (0.06 mole) of 2-tt-octyl-4-methylphenol and 6.9 grams (0.03 mole) of 2,6-bishydroxymethyl-4-phenylphenol in 25 ml. of glacial acetic acid was saturated with dry hydrogen chloride and allowed to stand at room temperature for 13 days. Filtration of the reaction mixture gave (a) 8.1 grams of a white crystalline solid melting at 150° C. after softening from 120° C. and (b) a viscous liquid filtrate.

The crystalline product was ground under petroleum ether and on filtration yielded 7.6 grams. Recrystallization from ethyl acetate and petroleum ether gave 1.7 grams of crystals melting at 145–148° C. and 2.5 grams of crystals from the filtrate melting at 150–152° C. (Cloudy.) The latter portion on recrystallization melted at 155–160° C.; weight: 2.0 grams. This product has the foregoing general formula, with $n$ equal to 1.

The filtrate from the first crystallization was partitioned between water and ether, and the separated ether solution was washed with sodium bicarbonate solution and dried over anhydrous potassium carbonate. Evaporation of the filtered solution gave a brown liquid residue which was dissolved in petroleum ether and filtered from a white precipitate weighing 0.6 gram and melting at 200–210° C. with preliminary softening. The evaporated filtrate gave 9.0 grams of a viscous brown liquid. This product has the foregoing general formula, but with $n$ greater than 1.

*Example 3*

REACTION PRODUCT OF BISHYDROXYMETHYL-4-PHENYLPHENOL AND T-BUTYL-4-METHYLPHENOL

A mixture of 13.1 grams (0.08 mole) of t-butyl-4-methylphenol and 9.2 grams (0.04 mole) of bishydroxymethyl-4-phenylphenol were dissolved in 30 ml. of warm glacial acetic acid. The solution was cooled somewhat and saturated with dry hydrogen chloride. After 8 days at room temperature, the reaction mixture was poured into 1500 ml. of water. The product separated as a white solid which was filtered off, washed free of acid with water, and dried in vacuo; weight 20.0 grams. In a capillary tube the product softened at 80–90° C. and melted to a cloudy liquid at 118–120° C.

*Example 4*

REACTION PRODUCTS OF BISHYDROXYMETHYL-P-PHENYLPHENOL AND ALKYLATED CRESYLIC ACID

*Preparation of alkylated cresylic acid.*—The alkylated cresylic acids may be prepared from different alkylating agents and using different catalysts. Thus, one may alkylate with isobutylene, diisobutylene, triisobutylene, dipropylene, tripropylene, tetrapropylene, mixed heptenes, mixed octenes, mixed nonenes, mixed decenes, mixed dodecenes, or other olefin or a mixture of olefins, and in such cases sulfuric acid or $BF_3$ (or its adducts with ethers, phenols, etc.) may be used as a catalyst. Alternatively, the alkylation may be conducted by a Friedel-Crafts reaction using an alkyl halide preferably of three or more carbon atoms, such as a chloro or bromo derivative of n-butane, isobutane, any pentane, hexane, heptane, octane, nonane, decane, etc., or a mixture thereof. In general, the alkylated cresylic acids will contain no alkyl group higher than dodecyl. Any suitable method of alkylation may be employed, such as one utilizing an aliphatic alcohol corresponding to the olefins or alkyl halides mentioned above, etc.

The alkylated cresylic acid used in the following example was prepared as follows:

To a 50-gal. jacketed glass-lined reactor were charged 128.0 pounds of petroleum cresylic acid (boiling range 193° to 226° C.) and 4.3 pounds of concentrated sulfuric acid (95.5%). This mixture was stirred while adding 107 pounds of diisobutylene over 3.0 hours, controlling the temperature with cold water in the jacket to 70 to 85° F. After stirring 1.5 hours an additional 2.6 pounds concentrated sulfuric acid were added and stirring was continued for one hour, controlling the temperature at 75 to 88° F. The reaction was then stopped by addition of 10.5 gals. of water. The mixture was heated to 170 to 200° F. and the water layer was separated after the emulsion broke. The organic layer was transferred to a still, 2.6 pounds anhydrous sodium carbonate and 0.25 pound anhydrous sodium sulfite were added, and the forerun was removed first at atmospheric and then at reduced pressure. The product was distilled through a packed column under reduced pressure. The yield was 158.8 pounds (67.5% on the combined weight of the diisobutylene and cresylic acid) of a material boiling in the range of 92.5° C./1.5 mm. to 112° C./0.7 mm. The product used was obtained by redistillation and had a boiling range of 140° C./10 mm. to 190° C./3 mm. It had a specific gravity ($d\ 25/4$) of about .935. Its refractive index ($n_D^{25}$) was about 1.5086.

*Reaction products.*—A mixture of 13.3 grams (0.06 mole) of the highly alkylated cresylic acid, and 6.9 grams (0.03 mole) of bishydroxymethyl-4-phenylphenol were dissolved in 25 ml. of glacial acetic acid and the solution was saturated with dry hydrogen chloride. After 13 days at room temperature the mixture was filtered and 1.6 grams of a white solid were collected. The filtrate was diluted with water and extracted into ether. The ether solution was washed free of acid with dilute sodium bicarbonate solution and dried over anhydrous potassium carbonate. Filtration and evaporation of the filtrate gave a gummy brown residue which on stirring with petroleum ether and filtering yielded 7.3 grams of a gray-white solid. This material, in a capillary tube, softened at 100° C. and melted at 175–180° C. This product has the foregoing general formula, with $n$ equal to 1.

The petroleum ether filtrate was evaporated to give 10.0 grams of a brown liquid. This product has the foregoing general formula, but with $n$ greater than 1.

TESTS IN RUBBER

Various tests were made in rubber. In reporting these tests herein the different products will be identified by reference to the foregoing example numbers.

Tests were conducted in a white sidewall tire stock. In the tests in the white sidewall rubber stock one part of each of the inhibitors was added to 197.3 parts of the following master batch compound:

| | Parts by weight |
|---|---|
| Natural rubber | 100 |
| Zinc oxide | 70 |
| Titanium dioxide | 20 |
| Stearic acid | 1.2 |
| Sulfur | 3 |
| Accelerator | 0.9 |
| Wax | 2 |
| Dye | 0.2 |
| Total | 197.3 |

In the following table, the modulus, tensile strength and elongation are all given in pounds per square inch. The oxygen absorption is based on the amount of oxygen absorbed per grams of the natural rubber polymer present, following the procedure given in the article by J. R. Shelton and Hugh Winn in Industrial and Engineering Chemistry, volume 38, page 71 (1946) and volume 40, page 2081 (1948).

The improvement produced is readily evident to the man skilled in the art. A blank containing no inhibitor, subjected to the same aging, would retain no more than about 35 percent of its original tensile and would require only about 24 hours for the absorption of 5 ml. of oxygen per gram of rubber hydrocarbon, or would absorb 10–15 ml. of oxygen per gram of rubber hydrocarbon in less time than the rubber stocks protected by the antioxidants of the present invention would absorb 5 ml. of oxygen.

Table

|  | Test 1 | Test 2A | Test 2B | Test 4A | Test 4B |
|---|---|---|---|---|---|
| Master batch | 197.3 | 197.3 | 197.3 | 197.3 | 197.3 |
| Example 1 | 1.0 |  |  |  |  |
| Example 2 (crystalline) |  | 1.0 |  |  |  |
| Example 2 (liquid) |  |  | 1.0 |  |  |
| Example 4 (solid) |  |  |  | 1.0 |  |
| Example 4 (liquid) |  |  |  |  | 1.0 |
| Cured: 60 minutes at 280° F. Normal properties: |  |  |  |  |  |
| Modulus 400% | 750 | 525 | 725 | 725 | 750 |
| Tensile | 3,150 | 2,675 | 3,125 | 3,250 | 3,200 |
| Elongation | 650 | 690 | 660 | 670 | 660 |
| Aged (air oven) 2 days at 212° F.: |  |  |  |  |  |
| Modulus 400% | 750 | 650 | 550 | 600 | 575 |
| Tensile | 1,675 | 1,675 | 1,500 | 1,650 | 1,450 |
| Percent tensile retained | 53 | 63 | 48 | 51 | 45 |
| Elongation | 530 | 550 | 570 | 580 | 580 |
| Oxygen absorption 90° C.: |  |  |  |  |  |
| Hours for absorption, 5 ml. O₂/g | 38 | 54 | 43 | 43 | 47 |
| Hours for absorption, 10 ml. O₂/g | 74 | 100 | 83 | 83 | 88 |
| Total oxygen absorbed, ml./g | 20.4 | 12.6 | 17.0 | 17.6 | 15.6 |
| Total hours in oxygen-absorption apparatus | 114 | 114 | 114 | 114 | 114 |

The advantages resulting from the use of the antioxidants of this invention are evident. The crystalline material of Example 2 is better than the liquid.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e.g. cyclohexyl benzothiazole sulfenamide, thiazoline sulfenamides, thiocarbamyl sulfenamides, mercaptothiazoles, mercaptothiazolines, thiazolyl mono- and di-sulfides, the dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned where desired, and such activators includes the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butyl xanthate, zinc ethyl xanthate, zinc salt of mercaptobenzothiazole, zinc dimethyl dithiocarbamate, and zinc dibutyl dithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature for several hours or a few days.

The foregoing examples are illustrative. The invention is defined in the claims that follow.

What I claim is:

1. A sulfur-vulcanized rubber composition which comprises natural rubber and as an inhibitor of oxidation thereof a small amount of a compound having the following formula

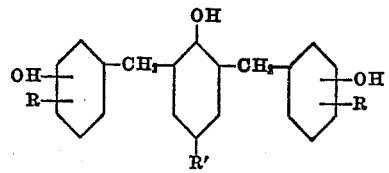

in which R' is an aryl hydrocarbon radical and each R is at least one group from the class consisting of alkyl groups and hydrocarbon-substituted alkyl groups, each such group containing 1 to 9 carbon atoms.

2. The rubber composition of claim 1 in which in the formula of the inhibitor R' is phenyl.

3. The rubber composition of claim 1 in which in the formula of the inhibitor, the positions in both terminal phenol nuclei ortho to the hydroxy group are occupied by one R and the methylene group, and the position para to the hydroxy group is occupied by another R.

4. The rubber composition of claim 1 in which in the formula of the inhibitor, R' is a phenyl group, and the positions in both terminal phenol nuclei ortho to the hydroxy group are occupied by one R and the methylene group, and the position para to the hydroxy group is occupied by another R.

5. The rubber composition of claim 1 in which in the formula of the inhibitor, R' is a phenyl group, the positions in both terminal phenol nuclei ortho to the hydroxy groups are occupied by one R and the methylene group, and the meta position adjacent the methylene group is occupied by another R.

6. The rubber composition of claim 1 in which in the formula for the inhibitor R' is a phenyl group, the positions in both terminal phenol nuclei ortho to the hydroxy group are occupied by a t-butyl group and the methylene group, and the position para to the hydroxy group is occupied by a methyl group.

7. The rubber composition of claim 1 in which in the formula of the inhibitor R' is a phenyl group, the positions in both terminal phenol nuclei ortho to the hydroxy group are occupied by a tt-octyl group and the methylene group, and the position para to the hydroxy group is occupied by a methyl group.

8. The composition of claim 1 in which the inhibitor is obtained by reaction of 2,6-bishydroxymethyl-4-phenylphenol and an alkylated petroleum cresylic acid.

9. The method of vulcanizing a vulcanizable rubber composition composed essentially of natural rubber which comprises vulcanizing the same with sulfur in the presence of a compound having the following formula

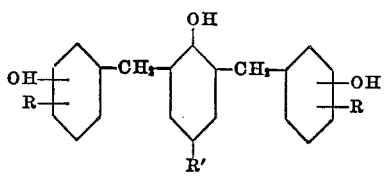

in which R' is an aryl hydrocarbon radical and each R is at least one group from the class consisting of alkyl groups and hydrocarbon-substituted alkyl groups, each such group containing 1 to 9 carbon atoms.

10. The method of claim 9 in which in the formula, R' is a phenyl group, the positons in both terminal phenol nuclei ortho to the hydroxy group are occupied by one R and the methylene group, and the position para to the hydroxy group is occupied by another R.

11. The method of claim 9 in which in the formula, R' is a phenyl group, the positions in both terminal phenol nuclei ortho to the hydroxy group are occupied by one R and the methylene group, and the meta position adjacent the methylene group is occupied by another R.

12. The method of claim 9 in which in the formula, R' is phenyl.

References Cited in the file of this patent

UNITED STATES PATENTS

| | | |
|---|---|---|
| 2,335,089 | Sibley | Nov. 23, 1943 |
| 2,773,907 | Sullivan et al. | Dec. 11, 1956 |
| 2,841,627 | Beaver et al. | July 1, 1958 |

FOREIGN PATENTS

| | | |
|---|---|---|
| 509,243 | Canada | Jan. 18, 1955 |

UNITED STATES PATENT OFFICE
CERTIFICATION OF CORRECTION

Patent No. 2,905,737                  September 22, 1959

Frederick J. Webb

It is hereby certified that error appears in the above numbered patent requiring correction and that the said Letters Patent should read as corrected below.

Column 2, line 34, for "8-t-butyl or tt-octyl-4-or 5-i-propylphenol" read -- 2-t-butyl or tt-octyl-4- or 5-i-propylphenol --; line 43, for "2-t-butyl-4-methylphenol" read -- 2-t-butyl-4-methylphenol --; line 44, for "2-t-amyl-4-methylphenol" read -- 2-t-amyl-4-methylphenol --; line 46, for "2-t-hexyl-4-methylphenol" read -- 2-t-hexyl-4-methylphenol --; line 48, for "2-t-octyl-4-methylphenol" read -- 2-t-octyl-4-methylphenol --; line 49, for "2-tt-octyl-4-methylphenol" read -- 2-tt-octyl-4-methylphenol --; line 57, for "PHENYLPHENOL AND 6-T-BUTYL-3-METHYLPHENOL" read -- PHENYLPHENOL AND 6-t-BUTYL-3-METHYLPHENOL --; same column 2, line 59, for "A mixture of 9.8 grams (0.06 mole) of 6-t-butyl-3-" read -- A mixture of 9.8 grams (0.06 mole) of 6-t-butyl-3- --; column 3, line 12, for "PHENYLPHENOL AND 2-TT-OCTYL-4-METHYL-" read -- PHENYLPHENOL AND 2-tt-OCTYL-4-METHYL- --; line 14, for "A mixture of 13.2 grams (0.06 mole) of 2-tt-octyl-4-" read -- A mixture of 13.2 grams (0.06 mole) of -tt-octyl-4- --; line 43, for "PHENYLPHENOL AND T-BUTYL-4-METHYLPHENOL" read -- PHENYLPHENOL AND t-BUTYL-4-METHYLPHENOL --; line 44, for "A mixture of 13.1 grams (0.08 mole) of t-butyl-4-" read -- A mixture of 13.1 grams (0.08 mole) of t-butyl-4- --; same column 3, line 57, for "REACTION PRODUCTS OF BISHYDROXYMETHYL-P-" read -- REACTION PRODUCTS OF BISHYDROXYMETHYL-p- --; column 6, line 45, for "group are occupied by a t-butyl group and the methylene" read -- group are occupied by a t-butyl group and the methylene --; line 51, for "hydroxy group are occupied by a tt-octyl group and the" read -- hydroxy group are occupied by a tt-octyl group and the --.

Signed and sealed this 21st day of November 1961.

(SEAL)
Attest:

ERNEST W. SWIDER                          DAVID L. LADD
Attesting Officer                            Commissioner of Patents